United States Patent
Sloan (10) Patent No.: US 10,685,048 B1
(45) Date of Patent: Jun. 16, 2020

(54) SYSTEMS AND METHODS FOR BOOLEAN-VALUATION-BASED SEARCHES

(71) Applicant: Allscripts Software, LLC, Raleigh, NC (US)

(72) Inventor: John C. Sloan, Raleigh, NC (US)

(73) Assignee: ALLSCRIPTS SOFTWARE, LLC, Raleigh, NC (US)

( * ) Notice: Subject to any disclaimer, the term of this patent is extended or adjusted under 35 U.S.C. 154(b) by 415 days.

(21) Appl. No.: 15/421,960

(22) Filed: Feb. 1, 2017

(51) Int. Cl.
*G06F 7/02* (2006.01)
*G06F 16/00* (2019.01)
*G06F 16/33* (2019.01)
*G06F 16/338* (2019.01)
G06F 16/22 (2019.01)
G06F 16/951 (2019.01)
G06F 16/903 (2019.01)

(52) U.S. Cl.
CPC ........ *G06F 16/3341* (2019.01); *G06F 16/338* (2019.01); *G06F 16/2237* (2019.01); *G06F 16/90335* (2019.01); *G06F 16/951* (2019.01)

(58) Field of Classification Search
CPC .. G06F 16/951; G06F 16/2237; G06F 16/248; G06F 16/43; G06F 16/90335; G06F 16/90344; G06F 16/9038; G06F 16/2428; G06N 5/04
See application file for complete search history.

(56) References Cited

U.S. PATENT DOCUMENTS

| | | | |
|---|---|---|---|
| 6,247,164 B1 | 6/2001 | Ashar et al. | |
| 7,139,743 B2 | 11/2006 | Indeck et al. | |
| 8,131,660 B2 | 3/2012 | Davis et al. | |
| 8,843,466 B1 * | 9/2014 | Zeiger | G06F 16/951 707/706 |
| 2007/0198497 A1 * | 8/2007 | Loftus | G06F 16/35 |
| 2011/0071819 A1 * | 3/2011 | Miller | G06F 17/273 704/9 |
| 2012/0095984 A1 * | 4/2012 | Wren-Hilton | G06F 16/9535 707/707 |
| 2012/0254219 A1 | 10/2012 | Bell | |
| 2016/0012131 A1 * | 1/2016 | Epstein | G06F 16/951 707/706 |
| 2016/0070583 A1 | 3/2016 | Chamberlain et al. | |

* cited by examiner

*Primary Examiner* — Bruce M Moser
(74) *Attorney, Agent, or Firm* — Medley, Behrens & Lewis, LLC

(57) ABSTRACT

Various technologies for performing Boolean valuation of a vector of input literals over a clause set representing a search space are described herein. For each of a plurality of literals in a literal vector, state vector entries that correspond to clauses in which the literal appears are incremented. Clauses are output as results based upon determining that state vector entries corresponding to the clauses meet or exceed target vector entries corresponding to the clauses.

20 Claims, 8 Drawing Sheets

SYSTEMS AND METHODS FOR BOOLEAN-VALUATION-BASED SEARCHES

BACKGROUND

Boolean valuation is an algorithmic process that, given a collection of literals comprising an input instance, identifies a satisfied subset of logical conjunctions in a previously defined set of conjunctions. A literal represents, inter alia, a symbol, word, phrase or proposition that may either be TRUE or FALSE. A conjunction, product, or AND-clause, is a set of literals where each literal is separated, either implicitly or explicitly, by an AND operator. A conjunction is said to be satisfied (i.e., TRUE) if all literals in the clause are TRUE. Any input instance satisfies zero or more conjunctions among a previously defined set of conjunctions. Such a previously defined set is also known as a rule set. A rule set can take the form of a set of sum of products Boolean expressions. In such a form, each sum-of-products expression maps to the same result, concept, class label or conclusion.

Conventional techniques for Boolean valuation have generally fallen into one of several broad classes: 1) heuristic approaches that are typically implemented by way of if-then statements in computer program code, 2) binary decision diagrams (BDDs), 3) trie data structures, and 4) hypergraph-based approaches. A choice of desirable technique may depend on rule set properties such as scale, sparseness, ordering, and clustering of data structures for input, lexicon, and results.

SUMMARY

The following is a brief summary of subject matter that is described in greater detail herein. This summary is not intended to be limiting as to the scope of the claims.

Various technologies pertaining to providing search results based upon Boolean valuation of a vector of input literals over a set of clause vectors representing a search space are described herein. A query can be input by way of a client computing device and the query is received at a server computing device. The server computing device uses a lexicon described as follows. A lexicon is a list of words, symbols, signs or codes collectively referred to as 'lexemes'. Associated with each lexeme is a list of clauses in which that lexeme appears. Such an association is referred to in its singular form as a lexeme's lexical map. More formally, each lexeme in a domain maps to possibly multiple clauses in its co-domain. In its collective form, the set of all lexical maps constitutes a lexical map. Individually, each lexical map forms a sub-space of the search space. By access to the lexicon, each input argument, raw input or source literal in the query (e.g., a word, phrase or previously computed result), can be encoded to a value in a bit vector. Each bit position in this vector corresponds to an entry in the lexicon. A literal present in both the query input and the lexicon is assigned the value of 1 for 'present', whereas an entry in the bit vector for a literal present in the lexicon but not in the query input is assigned the value of 0 for 'absent'. A co-domain of a lexical map, which forms a sub-space of a search space to which the query pertains, can be represented by a clause vector. The server computing device provides each literal's clause vector to a search component. The search component can be computer-executable instructions, or a hardware logic device such as a field-programmable gate array (FPGA) or an application-specific integrated circuit (ASIC).

In an exemplary embodiment, the search component is implemented as an ASIC that comprises conducting material arranged in a three-layer architecture, top, middle, and bottom. The top layer is a bus of parallel conductors running north and south, while the bottom layer runs east-west (i.e., in a direction perpendicular to the direction of the conductors of the top layer). In an example, the top layer comprises circuitry representative of the finite set of all literals in the lexicon, the circuitry arrayed across a top side of the top layer, while circuitry representative of the set of all clauses is arrayed top to bottom along a left side of the bottom layer. The circuitry representative of each literal comprises a latch flip-flop that, when pulsed, holds its charge at logic value 1 (i.e., TRUE) until its clear line is pulsed, whereupon the latch resets to logic value 0 (i.e., FALSE). Likewise, for each clause there is a latch. The middle layer of the ASIC is made up of AND-gates connecting the top layer to the bottom layer at junctions in the mesh (i.e., crossbar) corresponding to each literal-clause pair in the clause set. Connecting the output of each AND-gate, and situated along the right-hand side, are two arrays of structures, each element of which corresponds to exactly one clause. The first array is a state vector, each entry of which is maintained by its own counter device. The second array is a target vector, each entry of which is connected to its corresponding entry in the state vector by its own comparator device.

Operations of the exemplary ASIC when processing an input instance of literals are now described. As a subset of the set of all literals in the lexicon, an input instance can be configured to only pulse lines for latches corresponding to the literals in the input instance. Each input literal in the input control vector in turn carries its own distinct payload comprised of the list of all clauses in which that literal appears, namely the clause vector. The clause vector payload pulses latch flip-flops for the clauses in which the literal appears. By so enabling the mesh or crossbar in both orthogonal directions for those clauses, each clause's AND-gate becomes enabled. When enabled, each AND-gate outputs a logic value 1 to its counter, incrementing its state vector entry. The comparator compares the incremented state vector entry to its corresponding target vector entry. If corresponding state and target entries are equal, the comparator emits a logic 1 value back to the server computing device, indicating that the clause was satisfied. This process is repeated for each literal in the input instance. Upon completion, the server computing device identifies clauses for which the ASIC has returned a logic 1, and can output these clauses as search results to a querying computing device. The server computing device clears all latches and re-initializes all entries in the state vector to logic value 0.

In summary and regardless of implementation, the search component performs Boolean-valuation by summing the vectors associated with each logical literal in the input control vector. Each sum associated with each clause is stored in a state vector. Corresponding to the state vector is a target vector. Clauses having their sums in the state vector meeting or exceeding their clause-wise target quantities set forth in the target vector are considered satisfied. In particular, the search component executes the vector summation literal-wise for each entry valued at 1 in the input control vector. Each literal has a vector that lists the clauses in the clause set that include it. The search component increments state vector entries that correspond to the clauses that include the literal. The search component repeats this process for each of the literals in the input control vector. As this progresses, and as each clause's sum in the state vector meets or exceeds its target value in the target vector, the device outputs the result associated with satisfaction of that clause to the server computing device. The server computing device then provides these results to the client computing device, where they can be presented to a user on a display.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to Boolean valuation are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Figure 1:
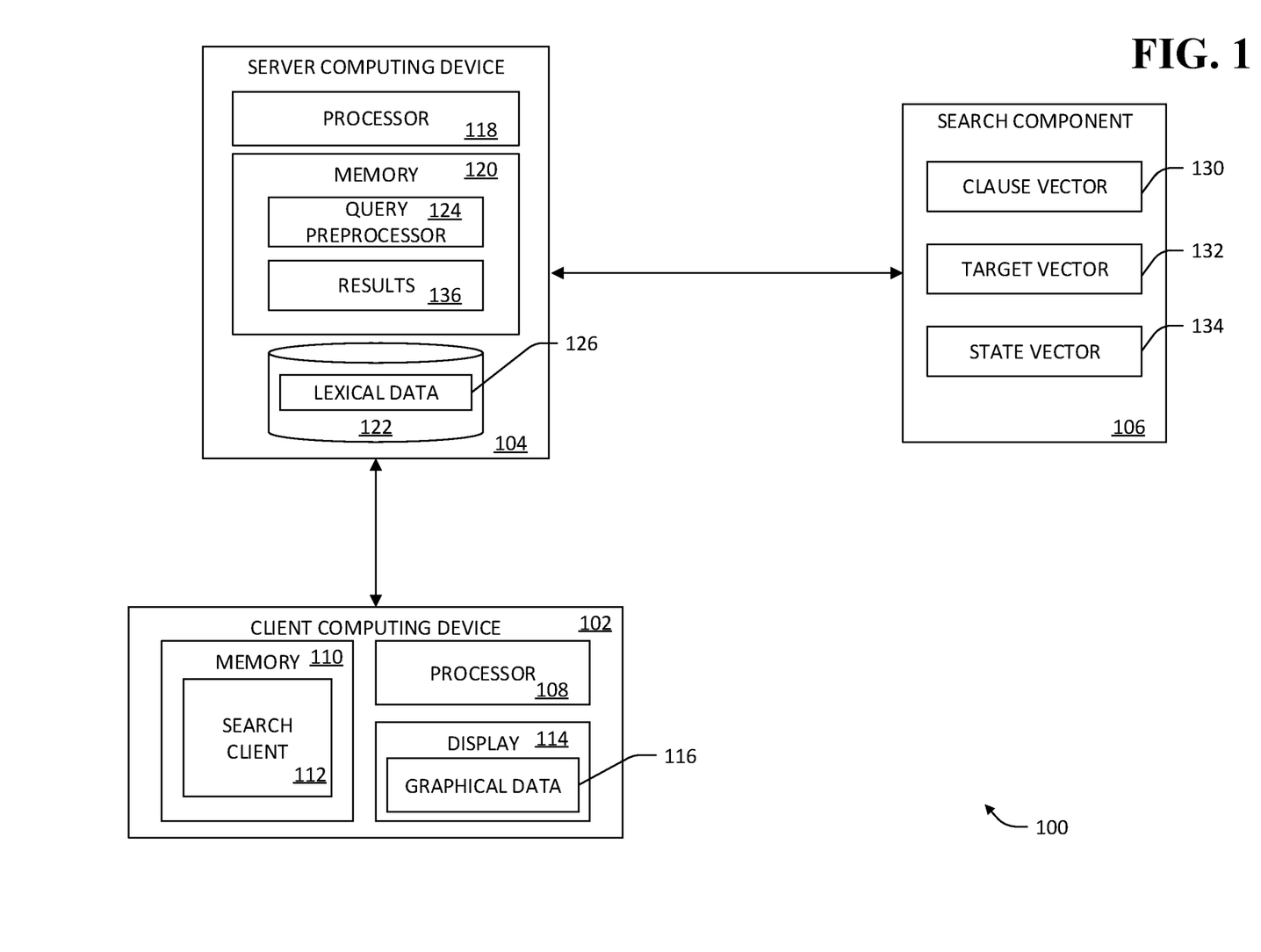
FIG. 1 is a functional block diagram of an exemplary system that facilitates Boolean valuation of a vector of input literals over a clause set representative of a search space.

With reference to FIG. 1, an exemplary system 100 that facilitates Boolean-valuation-based searches over a clause set representing a search space is illustrated. The system 100 includes a client computing device 102 and a server computing device 104 that receives queries issued by the client computing device 102. The system 100 further comprises a search component 106 in communication with the server computing device 104. The server computing device 104 provides input parameters based upon a received query to the search component 106, and the search component 106 executes a search over the clause set based upon the input parameters. The search component 106 outputs results data to the server computing device 104. The server computing device 104 provides the results to the client computing device 102 for presentment to a user.

The client computing device 102 comprises a processor 108 and memory 110 that comprises instructions executed by the processor 108. The memory 110 includes a search client 112 usable in connection with submitting queries to the server computing device 104. The search client 112 can be or include, for example, a web browser, a dedicated application, or a supplemental application executing in concert with another application. The client computing device 102 further comprises a display 114 on which can be displayed graphical data 116 such as a graphical user interface (GUI) for the search client 112, or search results.

The server computing device 104 comprises a processor 118, memory 120 comprising instructions executed by the processor 118, and a data store 122. The memory 120 includes a query preprocessor 124 that, when executed by the processor 118, performs various preprocessing operations over a query received from the client computing device 102 and lexical data 126 retained at the data store 122 in connection with providing search results responsive to the query.

The client computing device 102 transmits queries to the server computing device 104. The server computing device 104 preprocesses queries from the client computing device 102 to generate query data that can be readily processed by the search component 106. The server computing device 104 then provides query data to the search component 106. The search component 106 executes a Boolean-valuation-based search over a pre-defined clause set. The search component 106 then transmits results to the server computing device 104, which communicates the results to the client computing device 102. The client computing device 102 can then present the results to a user of the client computing device 102 on the display 114.

Details of operation of the system 100 are now described. The client computing device 102 transmits a query to the server computing device 104. The query can be generated by the search client 112 responsive to a user of the client computing device 102 interacting with the search client. The query identifies query inputs comprising one or more literals, and can further identify a search space over which a search for the literals is desirably performed. In other examples, the query does not specify the search space, and the search space can be identified based instead upon a prior configuration of the server computing device 104. The search space is a set of data over which the server computing device 104 and the search component 106 execute a search responsive to the server computing device 104 receiving a query from the client computing device 102. In some examples, the query can be or include free text such as sentences, paragraphs, or entire documents. For example, a user of the client computing device 102 can input text to the search client 112 by way of a human-machine interface (HMI), wherein the literals are words in the text. In an illustrative example, the search space can be a medical taxonomy such as the International Classification of Diseases (ICD), the query comprises a list of symptoms, and the server computing device 104 and search component 106 jointly execute a search over lexical data representative of the ICD responsive to receiving the query. In the example, the server computing device 104 returns a list of disease diagnoses as search results to the client computing device 102, wherein the disease diagnoses are diagnoses consistent with the symptoms identified in the query.

The server computing device 104 receives the query from the client computing device 102 and the query preprocessor 124 prepares a set of query data packets for transmittal to the search component 106 based upon the received query. The query data packets provide the search component 106 with a clause vector 130 representing each literal's search subspace. Each entry of a target vector 132 specifies the number of literal matches required for its clause to be returned in the result to server computing device 104. The target vector 132 may be pre-populated prior to this or any subsequent Boolean valuation, since its contents do not change during execution.

The query preprocessor 124 prepares the query data packets by performing various preprocessing operations based at least in part upon the query. For example, the query preprocessor 124 parses the query and identifies one or more input literals in the query. In one example, the query comprises text, and the query preprocessor 124 parses the query to identify words in the query. The query preprocessor 124 then generates an input control vector wherein each non-zero entry corresponds to a word in both the input query and lexicon. The search component 106 can be configured to execute a search over the clause vector 130 only for literals having a non-zero entry in the input control vector. Consequently, noise words present on input like 'a', 'an', 'the', 'this' or 'that' are ignored.

The query preprocessor 124 also generates the contents of the clause vector 130 for each input literal corresponding to a lexeme in a lexicon by accessing lexical data 126. The lexical data 126 includes a lexical map of input literals appearing in one or more documents, a plurality of web pages, etc., into a plurality of lexemes, with each lexeme representing a plurality of clauses, where each of the clauses comprises a logical conjunction of one or more logical literals. Generally, a literal is a symbol to which a value of "TRUE" or "FALSE" can be assigned. A clause is a logical conjunction of literals, which may itself be represented by another literal. Referring again to the example of the search space comprising the medical taxonomy, literals in a lexical map may be symptoms or other conditions of a patient that are associated with various diseases, and clauses may be logical conjunctions of the symptoms or conditions that are associated with a particular disease. For example, a lexical map of the medical taxonomy can include literals such as "pedal edema", "shortness of breath", and "chest pain", and a clause comprising the logical conjunction of these literals can be representative of heart failure. Continuing the example, the clause "pedal edema" AND "shortness of breath" AND "chest pain" (where AND is the logical conjunction operator) can itself be represented by the literal "428.9", which is the ICD-9 code for unspecified heart failure.

Figure 2:
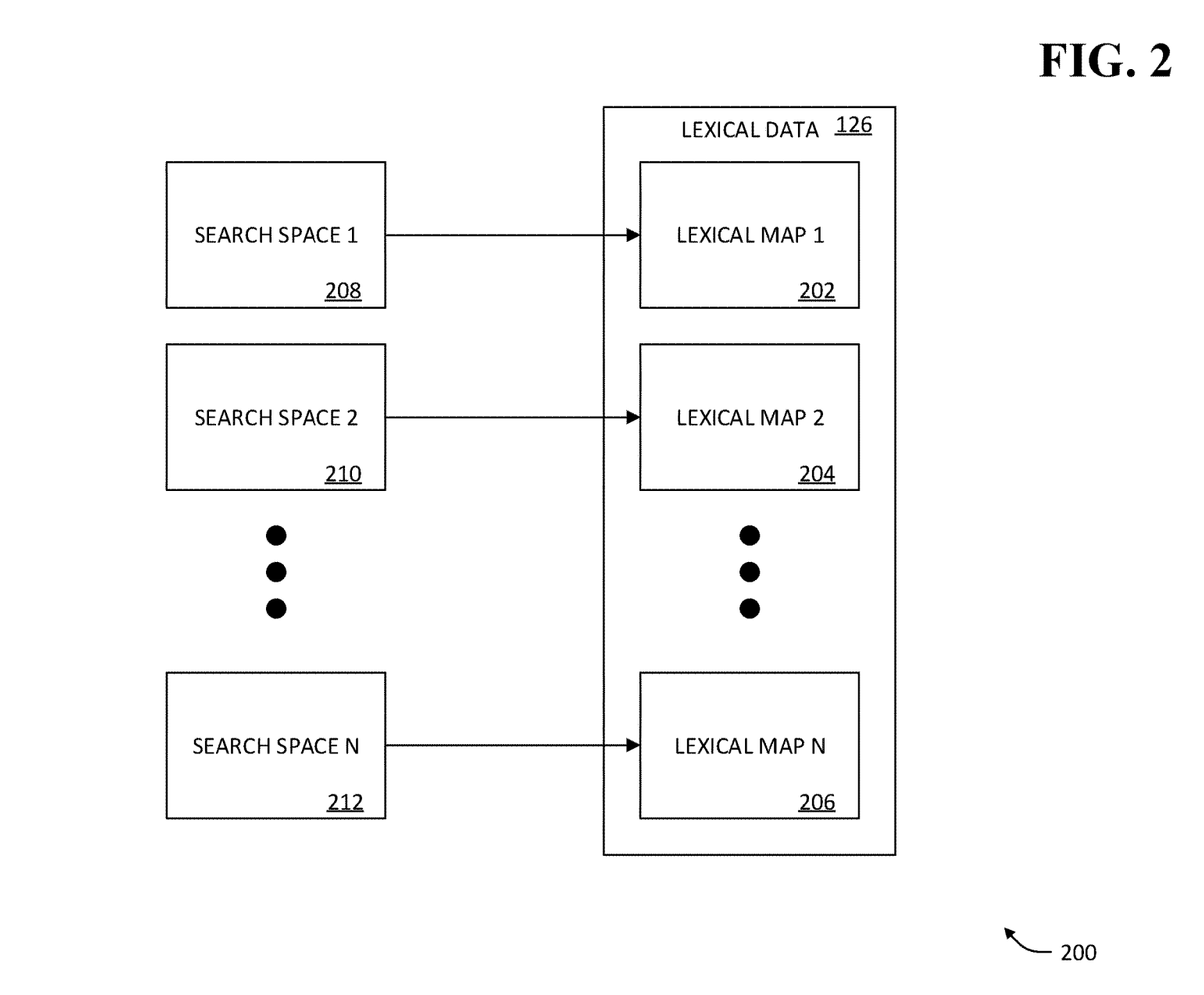
FIG. 2 illustrates exemplary lexical data.

The lexical data 126 can include a respective lexical map for each of a plurality of search spaces, wherein each search space is pre-defined as part of a rule set of conjunctions. With reference to FIG. 2, an exemplary illustration 200 of the lexical data 126 is shown, wherein the lexical data 126 comprises a plurality of n lexical maps 202-206 corresponding to a plurality of n search spaces 208-212, respectively. Thus, the query received by the server computing device 104 can comprise an indication of a search space, and the query preprocessor 124 can generate the contents of clause vector 130 that is transmitted to the search component 106 based upon a lexical map of the indicated search space. By way of example, the search space 210 can be a document, the query can identify the document 210 as a document over which a search is desirably conducted, and the query preprocessor 124 can generate packets for populating clause vector 130 based upon literals and their clauses in the lexical map 204.

Figure 3:
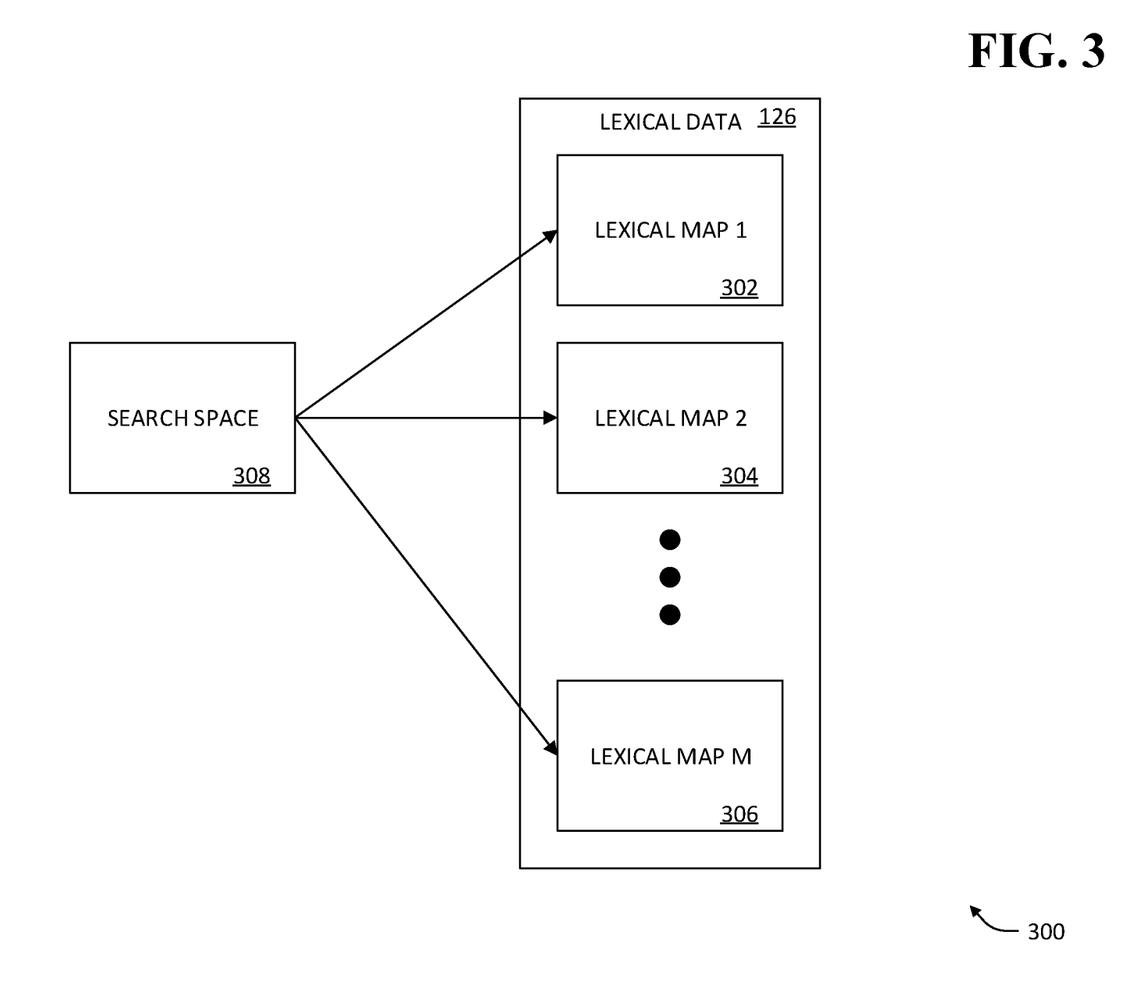
FIG. 3 illustrates additional exemplary lexical data.

The lexical data 126 can further include a plurality of lexical maps for a single search space. With reference to FIG. 3, an exemplary illustration 300 of the lexical data 126 is shown, wherein the lexical data 126 comprises a plurality of m lexical maps 302-306, wherein each of them lexical maps 302-306 is a different lexical map of a same search space 308. In an example, the search space 308 is an entire medical taxonomy, and the lexical map 302 can comprise a plurality of literals representative of symptoms of diseases, and a plurality of clauses representative of diseases, wherein each clause comprises a logical conjunction of a plurality of the literals in the lexical map 302. Continuing the example, the lexical map 304 can comprise a plurality of literals, possibly generated from literals that may have preceded it in the same lexical map 304, or from a prior lexical map 302, wherein the clauses in lexical map 304, if satisfied, correspond to more specific diseases than those described by the medical codes in the input instance in lexical map 304, or in input instances earlier in the document as in lexical map 302. In this way results appearing earlier in the document or sentence are used later in the document or sentence to further qualify, refine or specialize medical codes appearing in the result. The query can be indicative of one of them lexical maps 302-306 to be used by the query preprocessor 124 in constructing the contents of the clause vector 130. Thus, based upon which lexical map in the lexical maps 302-306 is identified in the query, the server computing device 104 and the search component 106 can generate a variety of different search results over the same search space 308.

The clause vector 130 generated by the query preprocessor 124 for a given literal may contain entries that take the form of addresses of all clauses in which that literal appears. Alternatively, the clause vector 130 may be binary encoded with each bit position corresponding to a clause. A bit valued at 1 indicates that that clause is among the clauses in which the literal appears. It is to be understood that as described herein, references made to clauses as entries of a clause vector are intended also to encompass addresses of clauses, or of their non-zero indicating bit values.

The search component 106, in some embodiments, has additional components. These may include, for example, components for the storage and processing of clause vector 130, the target vector 132, and the state vector 134, in addition to logic components typically packaged on commercially available FPGA's. These standard components can include a crossbar switch with circuitry implementing AND operations. The search component 106 receives the clause vector 130 from the server computing device 104, for each logical literal. The clause vector 130 is a vector of clauses identified in a lexical map in the lexical data 126 wherein the clauses are representative of a logical literal's search sub-space. The state vector 134 is a vector with its number of entries equaling the number of clauses in the clause set. Each entry in the clause vector 130, has a corresponding entry in state vector 134. Likewise, the target vector 132 its number of entries equal to the number of entries in the clause set. Each entry in clause vector 130 has a corresponding entry in target vector 132.

The search component 106 outputs search results as each literal amongst a plurality of literals in an input instance gets processed. It does this by maintaining a running count by clause in state vector 134. An FPGA implementation does this as follows: As each literal line and corresponding clause line combination (i.e., coordinate) on a crossbar are enabled (i.e., both at logic value '1') the corresponding state vector 134 entry gets incremented. FPGA's are pre-configured to form closed switches at pre-specified coordinates to implement AND-logic. The clause set comprised of literal-clause coordinates have been 'burned' into the crossbar prior to use, typically using ultraviolet light. A comparator circuit then compares the entry in state vector 134 to its corresponding entry in target vector 132. If the running count equals the target count, the clause identifier is output to results 136 on the server computing device 104.

An exemplary application of the system 100 is now described in which the system 100 is used in connection with providing diagnosis assistance to a clinician using an electronic health record application (EHR). A clinician user of the client computing device 102 inputs a string of words comprising a patient's symptoms by way of the search client 112, wherein the search client 112 is an EHR client, or a supplemental application to an EHR client. Responsive to receiving the string of words input by the clinician, the client computing device 102 transmits the string of words to the server computing device 104. The server computing device 104 receives the string of words, and executes the query preprocessor 124. The query preprocessor 124 parses the string to identify literals in the string that correspond to lexemes in lexical data 126, wherein the literals are the words in the string that describe symptoms of the patient. The query preprocessor 124 generates an input vector that comprises the words. The query preprocessor 124 generates a clause vector for each lexeme, wherein the lexical data 126 comprises a lexical map of a medical taxonomy such as the ICD. The clause vector comprises a plurality of logical conjunctions of symptoms, wherein each clause is representative of a disease name, alias, or word combination suggestive of some disease or disease state. The entries of the target vector can each identify a required number of literals making up the clause for the corresponding entries of the clause vector. By default, target numbers will equal the number of literals comprising a clause, but targets can be adjusted downward. The server computing device 104 then provides, for each literal, its clause vector 130 to the search component 106. In an exemplary embodiment in which the search component 106 comprises an FPGA, the clause vector 130 triggers its literal's flip-flop, which sits next to the flip-flops assigned to other literals. Orthogonally, the clause vector 130 sets all its flip-flops. This "energizes" the intersection points on the crossbar on all completed circuits, triggering incrementors to add each of these state vector entries. This process causes some clauses to reach their targets, whereupon the search component 106 outputs satisfied results back to server computing device 104. The server computing device 104 then transmits the disease results to the client computing device 102, where they are rendered on the display 114.

Figure 4:
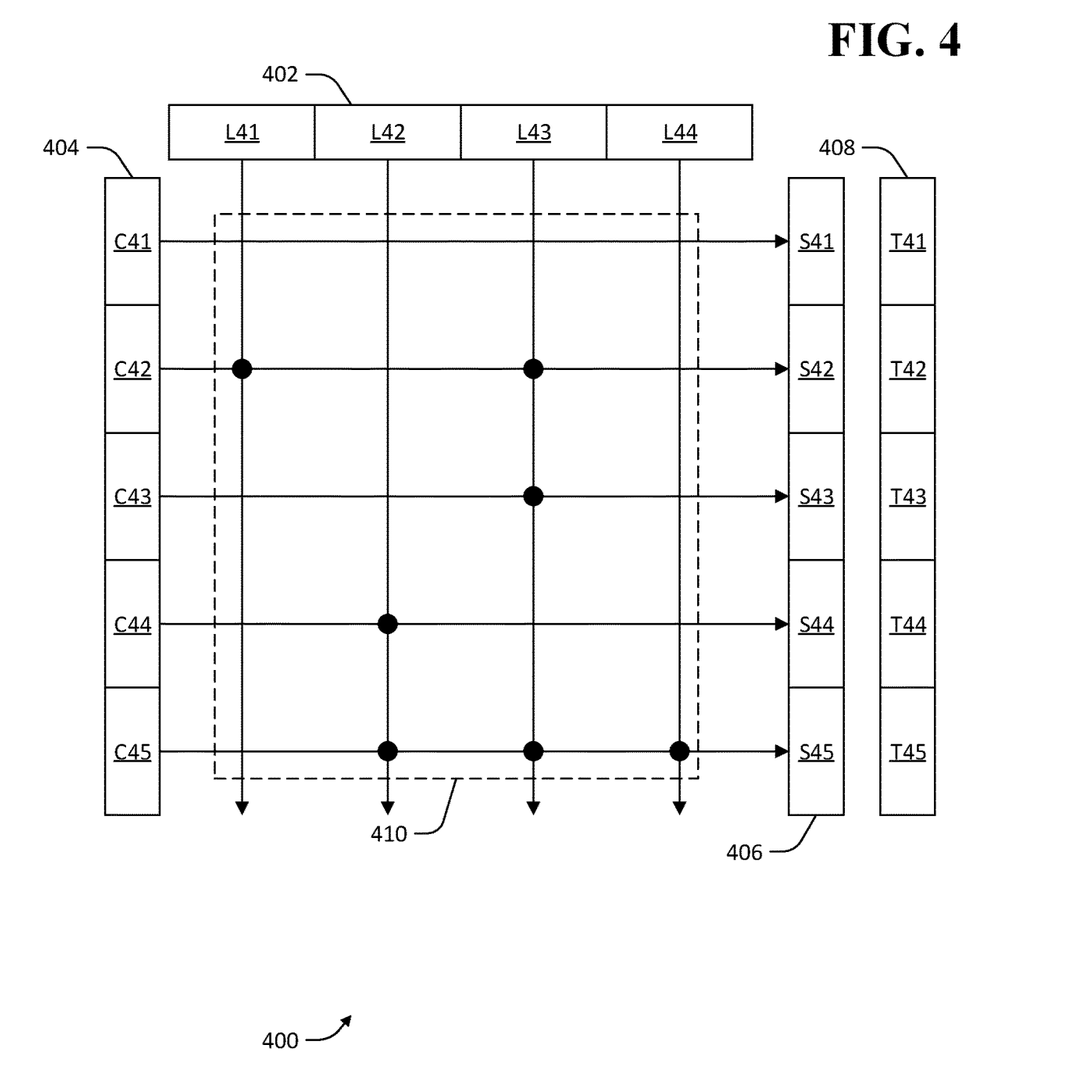
FIG. 4 is a diagram illustrating certain exemplary computations in connection with performing Boolean valuation by way of an FPGA.

Exemplary operations of an FPGA operating as a search component are now described with reference to FIG. 4, which illustrates a diagram 400 of exemplary computations. The diagram 400 shows a vector 402 listing all literals, a vector 404 listing all clauses, a state vector 406, and a target vector 408, the entries of each of the state vector 406 and the target vector 408 corresponding to each clause. The vector 402 comprises entries for literals L41-L44 such as, for example, words in a string of text input by way of the client computing device 102 for which there is a lexeme in a lexical map of a search space identified in a query. The vector 404 comprises entries C41-C45 that comprise clauses from the lexical map for each lexeme. The clauses C41-C45 are each associated with a respective plurality of literals. Dotted intersections are shown on a crossbar 410 and are the literals required to be present for any of clauses C41-C45 to be satisfied. The state vector 406 comprises entries S41-S45 and holds running counts based on what subset of literals L41-L45 are present in each clause. The target vector 408 comprises entries T41-T45 each of which are used to determine if the counts in the state vector are sufficient for any of clauses C41-C45 to be satisfied.

The search component 106 begins computations by initializing entries S41-S45 of the state vector 406 to zero. For each of the literals L41-L44 in the input instance 402, the search component 106 identifies clauses in the clauses C41-C45 that the literal is associated with. Thus, for example, the search component 106 can determine that the literal L41 is one of the literals in the plurality of literals associated with C42, as indicated by a solid circle at an interconnection between L41 and C42 in the diagram 400. When the search component 106 identifies that the literal L41 is one of the literals associated with the clause C42, the search component 106 increments the state vector entry S42 that corresponds to the clause C42. Similarly, the search component 106 determines that the literal L42 is associated with clauses C44 and C45, and increments the state vector entries S44 and S45 corresponding to clauses C44 and C45, respectively. The search component 106 does the same for literals L43 and L44, incrementing S42, S43, and S45 responsive to determining that L43 is associated with clauses C42, C43, and C45, and incrementing S45 responsive to determining that L44 is associated with clause C45.

Once the search component has evaluated each of the literals L41-L44 over the clause vector 404, the search component 106 evaluates the state vector entries S41-S45 relative to the target vector entries T41-T45. The target vector 408 identifies a target number of literal matches for each of the clauses C41-C45 in order for the clause to be returned as a result for the input instance 402 relative to the clause vector 404. Values of the entries T41-T45 of the target vector 408 can be specified as parameters in a query input by way of the client computing device 102. Alternatively, the server computing device 104 may store target vector values for clauses in the lexical data 126, and can transmit these values to the search component 106 responsive to receiving a query. The search component 106 determines whether the value of a state vector entry meets or exceeds the value of the corresponding target vector entry. If the state vector entry does meet or exceed the value of the corresponding target vector entry, the search component 106 returns a clause corresponding to the state vector entry as a search result. By way of example, if the target vector 408 as shown in the diagram 400 has values [1, 3, 1, 2, 3], the FPGA returns clauses C43 and C45 as search results since the state vector 406 has values [0, 2, 1, 1, 3], and only entries S43 and S45 meet or exceed the values of their corresponding entries in the target vector 408.

Figure 5:
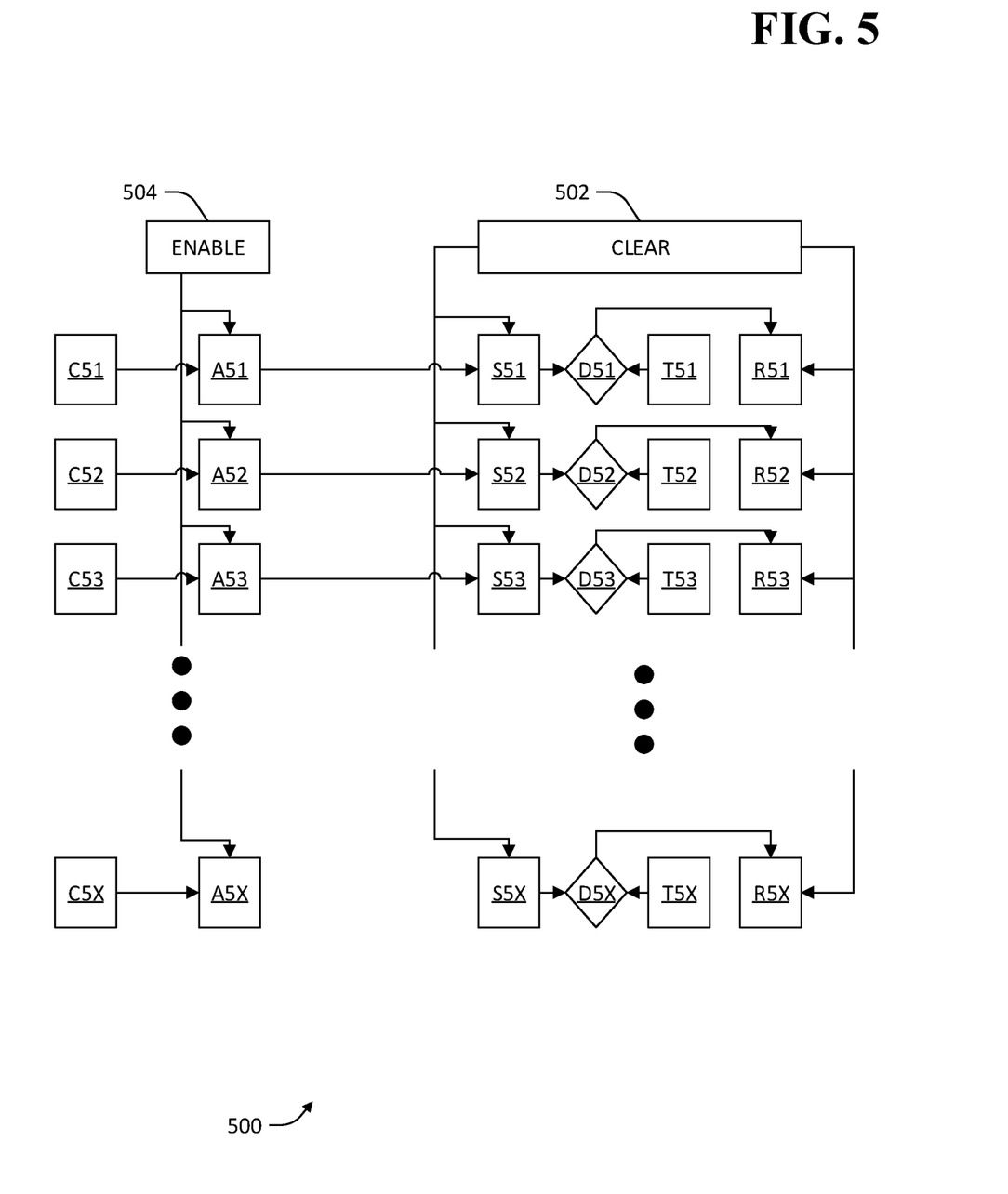
FIG. 5 is a diagram illustrating an exemplary configuration of an ASIC for performing Boolean valuation.

Referring now to FIG. 5, a block diagram of an exemplary ASIC 500 configured to perform operations in connection with Boolean valuation is illustrated. The ASIC 500 comprises a plurality of registers C51-C5X that together comprise a clause vector. The registers C51-C5X each store data indicative of literals that participate in the clause to which the respective registers C51-C5X correspond. In the ASIC 500, the registers C51-C5X have respective corresponding adders A51-A5X, state vector elements S51-S5X, target vector elements T51-T5X, comparators D51-D5X, and result vector elements R51-R5X.

Operations of the ASIC 500 in execution of a Boolean valuation procedure are now described. State vector elements S51-S5X and result vector elements A51-A5X are initialized to a zero-value state by pulsing a "clear" line 502. The registers C51-C5X of the clause vector are loaded with data indicative of literals that participate in X clauses represented by the registers C51-C5X. For each literal, an "enable" line 504 is pulsed, and adders A51-A5X, corresponding to clause registers C51-C5X for clauses in which the literal participates, increment values of their corresponding state vector elements in the elements S51-S5X. Each comparator in the comparators D51-D5X compares values of its respective state vector element and its respective target vector element, and outputs logic "1" to its respective result vector element when the value of the respective state vector element meets or exceeds the value of the respective target vector element.

It is to be understood that all or part of the operations described herein as being performed by the search component 106 may, in some embodiments, be performed by the server computing device 104. Similarly, operations described herein as being performed by the server computing device 104 can in some embodiments be performed by the search component 106. Furthermore, it is to be understood that the search component 106 can be implemented as a hardware logic device, such as an FPGA or ASIC, or as software executing on a computing device (e.g., the server computing device 104).

Figure 6:
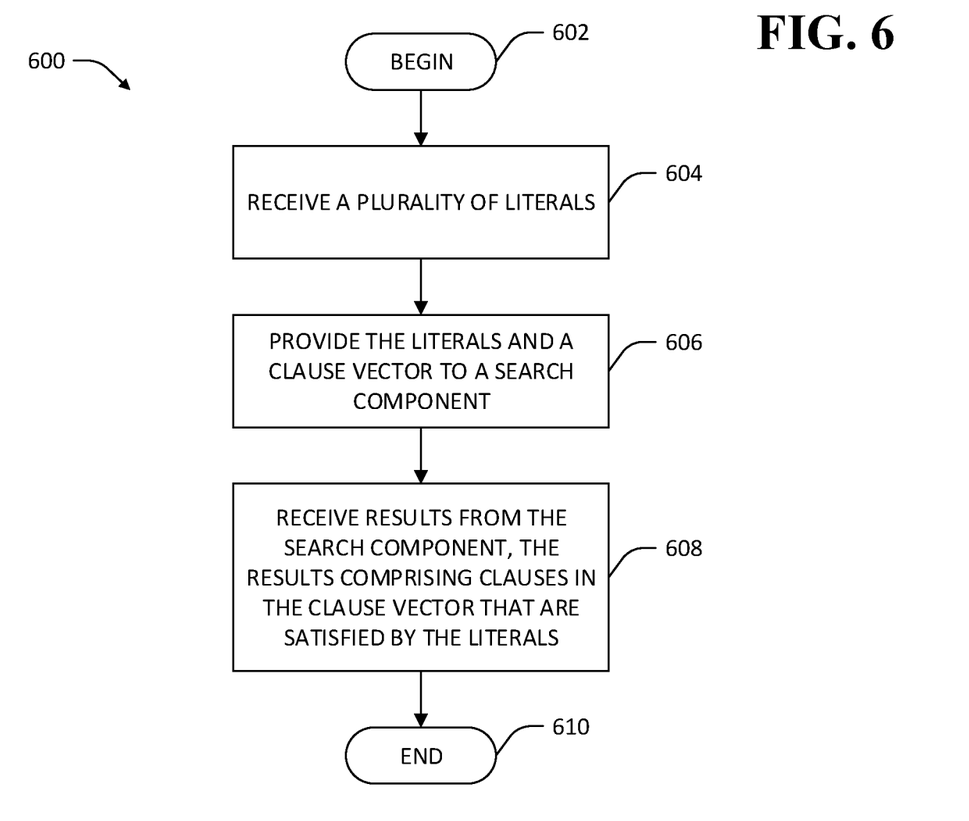
FIG. 6 is a flow diagram that illustrates an exemplary methodology for providing search results based upon performing Boolean valuation of input literals over a clause set representative of a search space.
Figure 7:
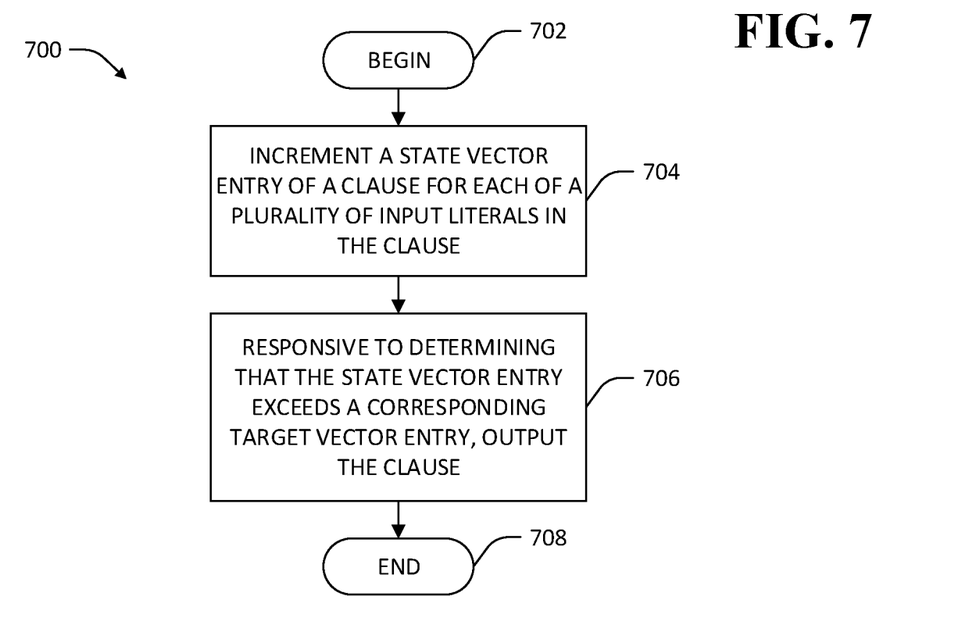
FIG. 7 is a flow diagram that illustrates an exemplary methodology for performing Boolean valuation.

FIGS. 6-7 illustrate exemplary methodologies relating to performing Boolean valuation over sparse clause sets for a set of input literals. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, a methodology 600 that facilitates searching for a plurality of input literals over a clause set is illustrated. The methodology 600 begins at 602, and at 604 a plurality of input literals are received. The input literals are symbols to which a value of true or false can be assigned. For example, for a lexicon of a literal words, words that are also in the input literals can be assigned a value of true in the lexicon. At 606, the input literals and a clause vector are provided to a search component. In one example, the search component comprises an FPGA. In another example, the search component can comprise computer-executable instructions that can be executed by a processor of a computing device. In still another example, the search component can be an ASIC. The clause vector comprises clauses in a lexical map of a search space. At 608, search results are received from the search component, where the results comprise clauses in the clause vector that are satisfied by the input literals. For example, the clauses can be a plurality of logical "AND" statements, and the results are "AND" statements that are satisfied when the input literals take a value of true. The methodology 600 ends at 610.

Referring now to FIG. 7, a methodology 700 for execution of a search for input literals over a clause set is illustrated. The methodology 700 begins at 702 and at 704 a state vector entry of a clause is incremented for each of a plurality of input literals present in the clause. By way of example, the clause can be the logical conjunction of literals symbolized by a, b, and c. In other words, a Boolean representation of the clause is a AND b AND c. In the example, the state vector entry of the clause is incremented for each input literal that is one of a, b, or c. At 706, the clause is output responsive to determining that the state vector entry for the clause exceeds a corresponding target vector entry. For example, the target vector entry can be equal to a number of literals in the clause, and the clause is output based upon a value of the state vector meeting or exceeding the number of literals in the clause. At 708 the methodology 700 ends.

Figure 8:
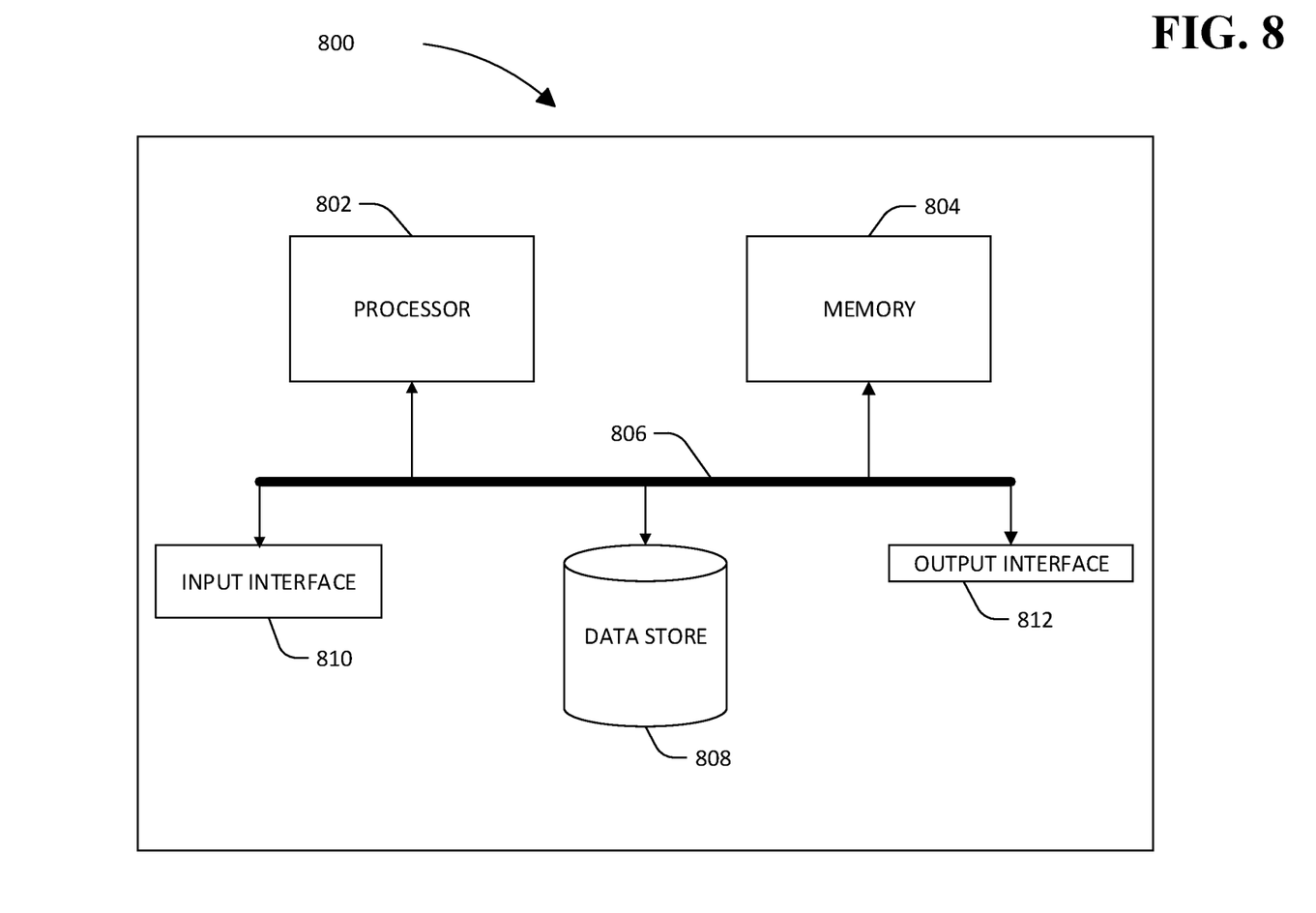
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that performs Boolean valuation of a set of input literals over a lexical map of a search space. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store lexical data, search results, input literals, etc.

The computing device 800 additionally includes a data store 808 that is accessible by the processor 802 by way of the system bus 806. The data store 808 may include executable instructions, lexical data, search results, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
   at least one processor; and
   memory comprising instructions that, when executed by the at least one processor, cause the at least one processor to perform acts comprising:
      responsive to receiving an input literal vector comprising a first plurality of literals pertaining to a search space defined by a lexical map that comprises a second plurality of literals, the second plurality of literals comprising words in the search space, the first plurality of literals being a subset of the second plurality of literals, executing a search for the first plurality of literals over a clause vector comprising clauses representative of the search space, wherein each of the clauses is associated with one or more literals in the second plurality of literals, wherein executing the search comprises:
         for each of the first plurality of literals, responsive to determining that a literal is in a clause in the clause vector, incrementing an entry in a state vector, the entry corresponding to the clause; and
         identifying results of the search based upon determining which entries in the state vector have a value that meets or exceeds a value of a corresponding entry of a target vector; and
      outputting the results of the search to a client computing device, the client computing device configured to display the results on a display, the results comprising clauses in the clause vector that are satisfied by the first plurality of literals.

2. The system of claim 1, the acts further comprising: responsive to receiving a query from the client computing device, generating the input literal vector based upon the query.

3. The system of claim 2, wherein the lexical map is identified by the query.

4. The system of claim 3, the search space being a medical taxonomy, the second plurality of literals representative of symptoms and diseases identified in the medical taxonomy.

5. The system of claim 4, the clauses in the clause vector comprising respective logical conjunctions of literals in the second plurality of literals.

6. The system of claim 4, wherein the results comprise literals representing the clauses in the clause vector that are satisfied by the first plurality of literals.

7. The system of claim 2, the query comprising one or more words, the first plurality of literals being words in the one or more words.

8. The system of claim 7, the first plurality of literals being symptoms, the results comprising diseases associated with the symptoms.

9. The system of claim 1, wherein the state vector and the target vector each have a respective plurality of entries, wherein each entry in the state vector represents a different clause in the clauses, and wherein each entry in the target vector represents a different clause in the clauses.

10. A method executed at a computing device, the method comprising:
responsive to receiving an input literal vector comprising a first plurality of literals pertaining to a search space defined by a lexical map that comprises a second plurality of literals, the second plurality of literals comprising words in the search space, the first plurality of literals being a subset of the second plurality of literals, executing a search over a clause vector, the clause vector representative of the search space, clauses in the clause vector comprising literals in the first plurality of literals, wherein each of the clauses is associated with one or more literals in the second plurality of literals, wherein executing the search comprises:
for each of the first plurality of literals, responsive to determining that a literal is in a clause in the clause vector, incrementing an entry in a state vector, the entry corresponding to the clause; and
outputting results of the search to a display of a computing device based upon determining which entries in the state vector have a value that meets or exceeds a value of a corresponding entry in a target vector, the results comprising clauses in the clause vector that are satisfied by the first plurality of literals.

11. The method of claim 10, wherein executing the search is performed at least in part by a field-programmable gate array (FPGA).

12. The method of claim 10, wherein the first plurality of literals, the second plurality of literals, and the clauses comprise words in a medical taxonomy, wherein the search space is the medical taxonomy.

13. The method of claim 10, wherein each of the clauses comprises a logical conjunction of one or more literals in the second plurality of literals.

14. The method of claim 10, wherein the clauses are diseases identified in the medical taxonomy, wherein further the first plurality of literals are symptoms associated with the diseases in the medical taxonomy.

15. The method of claim 10, wherein the state vector and the target vector each have a respective plurality of entries, wherein each entry in the state vector represents a different clause in the clauses, and wherein each entry in the target vector represents a different clause in the clauses.

16. The method of claim 10, further comprising generating the clause vector based upon the lexical map of the search space.

17. A system, comprising:
a hardware logic component; and
a computing device that comprises:
at least one processor; and
memory comprising instructions that, when executed by the at least one processor cause the at least one processor to perform first acts comprising:
responsive to receiving text input, generating a literal vector that is representative of the text input, the literal vector comprising entries corresponding to a first plurality of literals, the literal vector generated based upon a lexical map of a search space that comprises a second plurality of literals, the second plurality of literals comprising words in the search space, the first plurality of literals being a subset of the second plurality of literals; and
providing the literal vector and a clause vector to the hardware logic component, the clause vector representative of clauses that comprise literals in the first plurality of literals, wherein each of the clauses is associated with one or more literals in the second plurality of literals, wherein providing the literal vector and the clause vector causes the hardware logic component to perform second acts comprising:
for each literal in the literal vector, incrementing entries of a state vector that correspond to clauses satisfied by the literal, wherein the entries of the state vector correspond to clauses represented by the clause vector; and
outputting one or more clauses as results based upon determining that state vector entries corresponding to the one or more clauses meet or exceed target vector entries corresponding to the one or more clauses.

18. The system of claim 17, wherein the hardware logic component comprises one of an application-specific integrated circuit (ASIC) or a field-programmable gate array (FPGA).

19. The system of claim 18, the first acts further comprising generating the clause vector based upon the lexical map of the search space.

20. The system of claim 18, the second acts further comprising determining that a first clause is satisfied by a first literal in the literal vector, wherein determining that the first clause is satisfied by the first literal comprises:
energizing a crossbar switch included on the hardware logic component based upon the literal vector and the clause vector; and
determining that the first clause is satisfied by the first literal based upon an output line of the crossbar switch being energized.

* * * * *